United States Patent [19]
Omori

[11] Patent Number: 5,977,984
[45] Date of Patent: Nov. 2, 1999

[54] RENDERING APPARATUS AND METHOD

[75] Inventor: Mutsuhiro Omori, Kanagawa, Japan

[73] Assignee: Sony Corporation, Tokyo, Japan

[21] Appl. No.: 08/995,871

[22] Filed: Dec. 22, 1997

[30] Foreign Application Priority Data

Dec. 24, 1996 [JP] Japan .................................. 8-342946

[51] Int. Cl.$^6$ ................................................ G06T 15/00
[52] U.S. Cl. .......................................................... 345/431
[58] Field of Search ..................................... 345/418, 431, 345/429, 430, 432

[56] References Cited

U.S. PATENT DOCUMENTS

| | | | |
|---|---|---|---|
| 5,748,195 | 5/1998 | Nin ........................................... | 345/431 |
| 5,761,392 | 6/1998 | Yacoub et al. ........................... | 345/431 |
| 5,768,410 | 6/1998 | Ohta et al. ............................... | 345/431 |
| 5,774,126 | 6/1998 | Chatterjee et al. ...................... | 345/431 |

Primary Examiner—Phu K. Nguyen
Assistant Examiner—Cliff N. Vo
Attorney, Agent, or Firm—Fulwider Patton Lee & Utecht, LLP

[57] ABSTRACT

It is determined, for each polygon, whether to perform an operation of calculating coordinate data of apices of the polygon, offset values of a display position of the polygon, and color data of the apices of the polygon on a coordinate system corresponding to a given display area based on coordinate data and color data of the apices of the polygon in a three-dimensional space, or an operation of calculating only the offset values of the display position of the polygon, and the determined operation is performed. Coordinate data of the apices of the polygon in the display area that are obtained by adding together the calculated offset values of the display position of the polygon and one of the calculated coordinate data of the apices of the polygon and the coordinate values of the apices of the polygon supplied from a memory are output, and one of the calculated color data of the apices of the polygon and the color data of the apices of the polygon supplied from the memory are also output. The polygon is rendered so as to correspond to the output coordinate data of the apices of the polygon and the output color data of the apices of the polygon in the display area.

14 Claims, 6 Drawing Sheets

RENDERING APPARATUS AND METHOD

BACKGROUND OF THE INVENTION

1. Field of the Invention

The present invention relates to a rendering apparatus and method and, particularly, to a rendering apparatus and method which converts apex data of a polygon in a three-dimensional space into data on a coordinate system corresponding to a given display area and renders the polygon based on the converted data.

2. Description of the Related Art

With the recent development of the semiconductor technologies, the processing ability of computing devices for image processing has been improved.

Figure 1A:
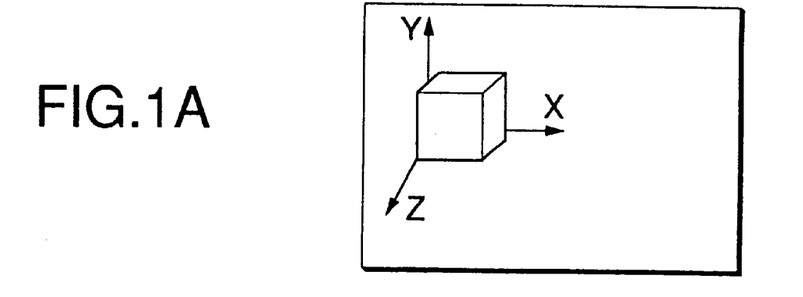
FIGS. 1A–1C show coordinate systems used for expressing an object.

In the computer graphics, one method for displaying a three-dimensional object on a display device is to express the three-dimensional object by utilizing a plurality of two-dimensional figures (polygons) of a predetermined fundamental form (for instance, a triangle). As shown in FIG. 1A, such a three-dimensional object is defined on an object coordinate system that is set on an object-by-object basis.

For example, when a moving picture is generated in accordance with an operation of an object according to a given application program, the object, the background, etc. that constitute each frame is rendered from one frame to another.

In this case, for each frame, data in a three-dimensional space of each apex of polygons corresponding to the object that constitutes the frame is converted into data on a device coordinate system that corresponds to a two-dimensional display area and then the polygons are rendered based on the converted data.

Figure 1B:
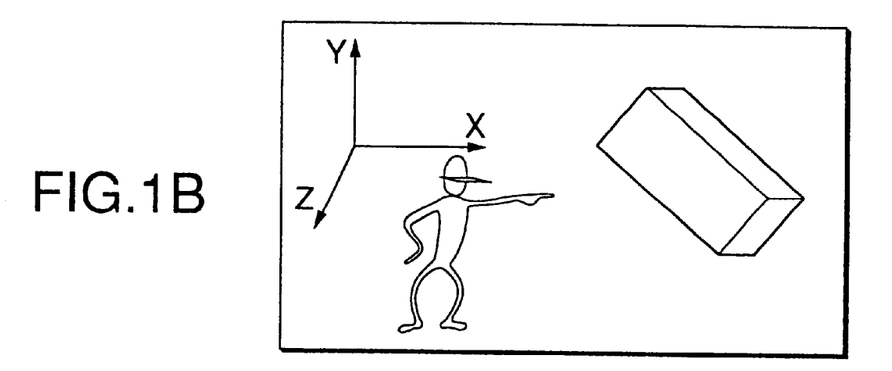
Figure 1C:
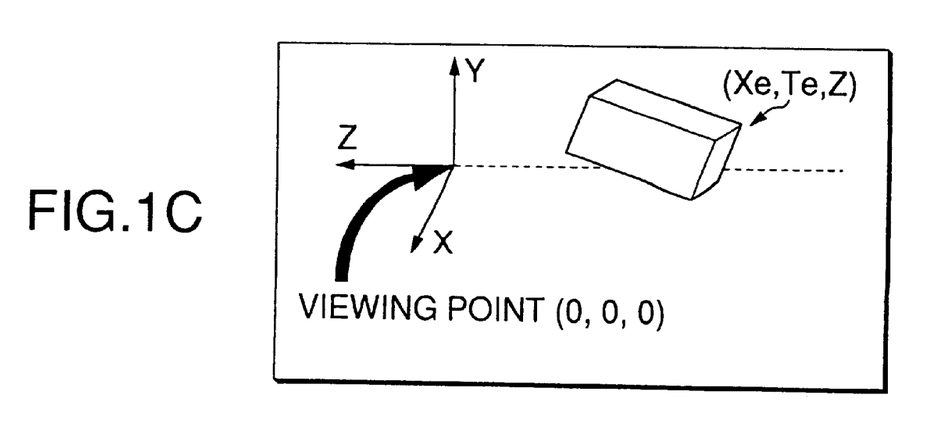

In the above conversion, first, coordinates of each apex in a three-dimensional world coordinate system (see FIG. 1B) are converted into coordinates on an eye coordinate system (see FIG. 1C) having a viewing point as the origin (perspective transformation).

Figure 2A:
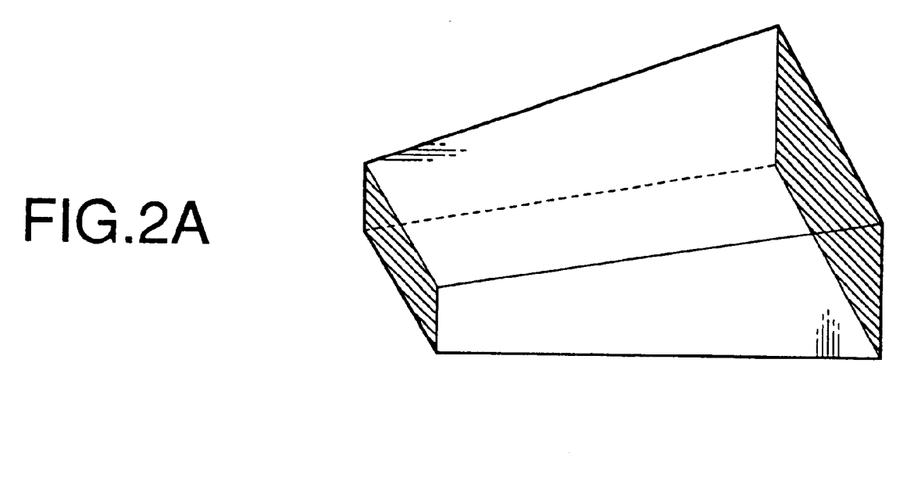
FIGS. 2A and 2B are perspective views showing an example of a view volume.

Then, a view volume that is a region (space) in the eye coordinate system to be displayed in the display area is set. As shown in FIG. 2A, the view volume is a hexahedron that is part of a quadratic pyramid having the viewing point as the top apex.

Figure 2B:
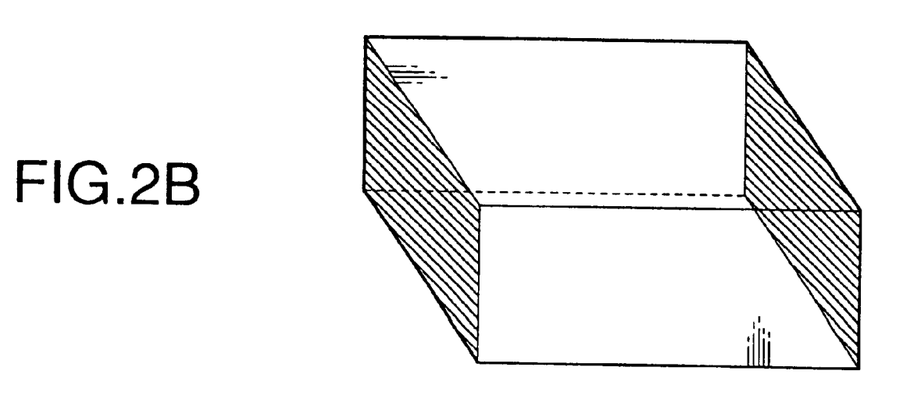

To simplify a judgment as to whether each apex of polygons exists in the view volume, coordinate conversion (clip conversion) is performed to convert the view volume into a rectangular parallelepiped as shown in FIG. 2B.

After a clip process is executed by using the rectangular parallelepiped as the view volume, the coordinates of each apex are converted into the device coordinate system corresponding to the display area (view port conversion).

Further, a normal vector of each apex of polygons is subjected to perspective transformation, and color data of each apex is calculated from transformed data.

As described above, the coordinates of each apex of polygons are subjected to perspective transformation, clip conversion, and view port conversion, and color data of the apex is calculated from a normal vector of the apex.

However, since data (coordinates and color data) of the apices of polygons are converted through the above described computation on a frame-by-frame basis, the amount of computation is enormous. Where the rendering is performed at a given processing speed, the above computation accounts for a large part of the rendering process. This causes problems that a computing circuit dedicated to the above computation is necessary and that it is difficult to reduce the cost of the apparatus.

SUMMARY OF THE INVENTION

The present invention has been made in view of the above circumstances, and an object of the invention is therefore to reduce the amount of computation in calculating coordinates and color data on a device coordinate system by storing, for instance, coordinates-converted data of polygons of little motion and utilizing those data for the subsequent frames.

The invention provides a rendering apparatus for converting data of apices of a polygon in a three-dimensional space into data on a coordinate system corresponding to a given display area and rendering the polygon corresponding to the converted data, comprising a computing circuit for calculating, for each polygon, coordinate data of apices of the polygon, offset values of a display position of the polygon, and color data of the apices of the polygon on a coordinate system corresponding to a given display area based on coordinate data and color data of the apices of the polygon in a three-dimensional space, the computing circuit is controlled so as to switch between an operation of calculating the coordinate data of the apices of the polygon, the offset values of the display position of the polygon, and the color data of the apices of the polygon and an operation of calculating only the offset values of the display position of the polygon; a memory for storing coordinate data of the apices of the polygon and color data of the apices of the polygon; a data output circuit for outputting coordinate data of the apices of the polygon and color data of the apices of the polygon in the display area that are obtained from the offset values of the display position of the polygon and the coordinate data of the apices of the polygon that have been calculated by the computing circuit, the data output circuit further for adding together the offset values of the display position of the polygon that have been calculated by the computing circuit and one of the coordinate data of the apices of the polygon that have been calculated by the computing circuit and the coordinate values of the apices of the polygon supplied from the memory, and outputting one of the color data of the apices of the polygon that have been calculated by the computing circuit and the color data of the apices of the polygon supplied from the memory; and rendering circuit for rendering the polygon corresponding to the coordinate data of the apices of the polygon and the color data of the apices of the polygon in the display area that are supplied from the data output circuit.

Further, the invention provides a rendering method for converting data of apices of a polygon in a three-dimensional space into data on a coordinate system corresponding to a given display area and rendering the polygon corresponding to the converted data, comprising a computing step of determining, for each polygon, whether to perform an operation of calculating coordinate data of apices of the polygon, offset values of a display position of the polygon, and color data of the apices of the polygon on a coordinate system corresponding to a given display area based on coordinate data and color data of the apices of the polygon in a three-dimensional space, or an operation of calculating only the offset values of the display position of the polygon, and performing the determined operation; a data output step of outputting coordinate data of the apices of the polygon in the display area that are obtained by adding together the offset values of the display position of the polygon that have been calculated by the computing step and one of the coordinate data of the apices of the polygon that have been calculated by the computing step and the coordinate values of the apices of the polygon supplied from a memory, and outputting one of the color data of the apices of the polygon that have been calculated by the computing step and the color data of the apices of the polygon supplied from the memory; and a rendering step for rendering the polygon corresponding to the coordinate data of the apices of the polygon and the color data of the apices of the polygon in the display area that are output by the data output step.

DETAILED DESCRIPTION OF THE PREFERRED EMBODIMENT

Figure 3:
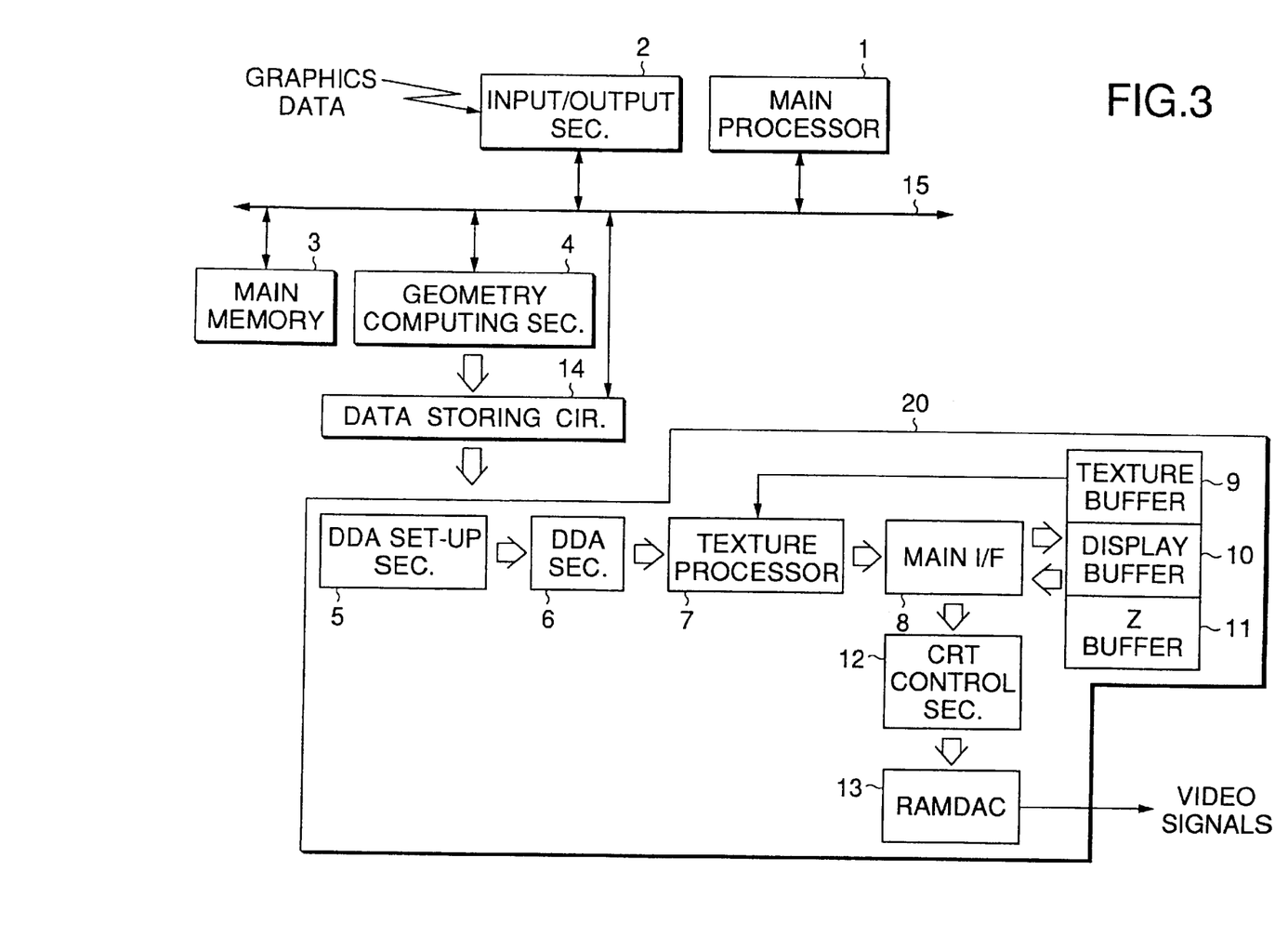
FIG. 3 is a block diagram showing the configuration of a rendering apparatus according to an embodiment of the invention.

FIG. 3 shows the configuration of a rendering apparatus according to an embodiment of the invention. A main processor 1 outputs, to a geometry computing section 4, graphics data that is supplied via an input/output section 2 or graphics data of a polygon that is stored in a main memory 3. The graphics data of a polygon is generated according to a given application program.

Further, according to the application program, the main processor 1 supplies the geometry computing section 4 with a first control signal indicating whether a polygon corresponding to data that is supplied to the geometry computing section 4 is to be rendered by using coordinate values and color data (stored in the main memory 3 as described later) that have been calculated by the geometry computing section 4, and with a second control signal indicating whether the coordinate values and color data, that have been calculated by the geometry computing section 4, of the polygon corresponding to the data that is supplied to the geometry computing section 4 are to be stored in the main memory 3.

The geometry computing section 4 performs coordinate conversion, clipping, lighting, etc. on graphics data that is supplied from the main processor 1 in accordance with the first control signal also supplied from the main processor 1, and outputs, to a data storing circuit 14, together with the first and second control signals, processed graphics data (polygon rendering data), i.e., coordinate data $\Delta Xd$, $\Delta Yd$, and $\Delta Zd$ and offset values $X_{offset}$, $Y_{offset}$, and $X_{offset}$ (described later), luminance values Cr, Cg, and Cb of red, green, and blue, a blending coefficient $\alpha$ that represents a ratio of blending luminance values (RGB values) of pixels to be drawn and pixel luminance values stored in a display buffer 10, texture coordinate values S, T, and Q, and a fog coefficient F all of which correspond to each apex of a polygon (triangle).

Although values S, T, Q on a homogeneous coordinate system are output as texture coordinate values, S/Q and T/Q multiplied by a texture size are used as actual texture coordinates. The fog coefficient F indicates a degree of blending a predetermined fog color in displaying, for instance, points with large Z values in a foggy expression.

The data storing circuit 14 outputs, as they are, the blending coefficient $\alpha$, the texture coordinate values S, T, and Q, the fog coefficient F to a DDA set-up section 5, and stores the coordinate data $\Delta Xd$, $\Delta Yd$, and $\Delta Zd$ and the luminance values (color data) Cr, Cg, and Cb that are supplied from the geometry computing section 4 in the main memory 3 via a bus 15 in accordance with the second control signal that is also supplied from the geometry computing section 4.

Further, the data storing circuit 14 calculates, as coordinate values X, Y, and Z, the sums of the coordinate data $\Delta Xd$, $\Delta Yd$, and $\Delta Zd$ that are supplied from the geometry computing section 4 or stored in the main memory 3 and the offset values $X_{offset}$, $Y_{offset}$, and $X_{offset}$ that are supplied from the geometry computing section 4, respectively, and outputs the calculated coordinate values to the DDA set-up section 5 together with the luminance values Cr, Cg, and Cb that are supplied from the geometry computing section 4 or stored in the main memory 3.

A rendering circuit 20 generates and outputs video signals corresponding to a polygon based on received polygon rendering data X, Y, Z, Cr. Cg, Cb, $\alpha$, S, T, Q, and F of each apex of the polygon (triangle).

Based on the received polygon rendering data X, Y, Z, Cr, Cg, Cb, $\alpha$, S, T, Q, and F of each apex of the polygon (triangle), the DDA set-up section 5 of the rendering circuit 20 calculates variations $\Delta z/\Delta X$, $\Delta Cr/\Delta X$, $\Delta Cg/\Delta X$, $\Delta Cb/\Delta X$, $\Delta\alpha/\Delta X$, $\Delta S/\Delta X$, $\Delta T/\Delta X$, $\Delta Q/\Delta X$, and $\Delta F/\Delta X$ of the polygon rendering data with respect to the X direction as well as variations $\Delta Z/\Delta Y$, $\Delta Cr/\Delta Y$, $\Delta Cg/\Delta Y$, $\Delta Cb/\Delta Y$, $\Delta\alpha/\Delta Y$, $\Delta S/\Delta Y$, $\Delta T/\Delta Y$, $\Delta Q/\Delta Y$, and $\Delta F/\Delta Y$ of the polygon rendering data with respect to the Y direction.

Further, the DDA set-up section 5 judges the type of a triangle shape based on the coordinate values of the respective apices of the polygon (triangle), and calculates initial values of the respective polygon rendering data at a rendering start point.

After moving the coordinate values of the rendering start point of the polygon (triangle) to a point on a side AC that has the same Y coordinate value as a span (an array of pixels arranged in the X direction; described later) closest to the rendering start point of the polygon, the DDA set-up section 5 calculates initial values of the respective polygon rendering data corresponding to the new coordinate values of the rendering start point and outputs those to a DDA section 6 together with the variations with respect to the X direction.

First, based on the variations of the respective polygon rendering data with respect to the X direction and the initial values of the respective polygon rendering data that are both supplied from the DDA set-up section 5, the DDA section 6 calculates values of the respective polygon rendering data corresponding to the pixel of a start point of the span by performing a DDA (digital differential analyzer) operation. Then, the DDA section 6 sequentially calculates coordinate values X and Y corresponding to the respective pixels of the span and values of the respective polygon rendering data Z, Cr, Cg, Cb, $\alpha$, S, T, Q, and F at the coordinates (X, Y), and outputs those to a texture processor 7.

The texture processor 7 reads out texture data from a texture buffer 9, and calculates actual texture coordinate values by dividing received texture coordinate values S and T by Q and multiplying a quotient by a texture size. Based on the read-out texture data, the texture processor 7 calculates luminance values at a texture address corresponding to the actual texture coordinate values S and T and a coefficient (texture $\alpha$ value) representing a blending ratio of the texture data. Further, the texture processor 7 blends luminance values supplied from the DDA section 6 and texture luminance values in accordance with the calculated coefficient.

Further, the texture processor 7 blends a given fog color with the above-calculated luminance values in accordance with the fog coefficient F, and outputs, together with the coordinate values X, Y, and Z, and the blending coefficient α, thus-generated luminance values to a memory interface 8 as luminance values of a pixel having the coordinate values X and Y that are supplied from the DDA section 6.

The texture buffer 9 stores in advance texture data corresponding to each level such as MIPMAP.

The memory interface 8 refers to a Z value of the Z buffer 11, and, if the received pixel is closer to the viewing point than the previously drawn pixel, updates the Z value of the Z buffer 10 to the received coordinate value Z and writes the received luminance values to the display buffer 10 at an address corresponding to the coordinates (X, Y).

Where the memory interface 8 is set so as to perform α blending, the memory interface 8 blends the luminance values stored in the display buffer 10 and the luminance values supplied from the texture processor 7 in accordance with the received blending coefficient α and writes generated luminance values to the display buffer 10.

A CRT control section 12 generates display addresses in synchronism with horizontal and vertical sync signals, and controls the memory interface 8 to cause it to transfer luminance values corresponding to the display addresses a specified number of luminance values at a time. The CRT control section 12 temporarily stores the received luminance values in an internal FIFO section (not shown), and outputs index values of those data to a RAMDAC 13 at predetermined intervals.

The RAMDAC 13 has a RAM section and a DAC section (digital/analog converter) section (both not shown). The RAM section stores in advance luminance values corresponding to respective index values. Luminance values corresponding to index values that are supplied from the CRT control section 12 are supplied from the RAM section to the DAC section. The luminance values are D/A-converted by the DAC section, and resulting analog video signals (RGB signals) are output to a predetermined apparatus (not shown).

Next, the operation of the rendering apparatus of FIG. 3 will be described.

First, the main processor 1 outputs data of a polygon to the geometry computing section 4 according to a given application program. At this time, according to the application program, the main processor 1 supplies the geometry computing section 4 with a first control signal indicating whether the polygon is to be rendered by using coordinate values and color data that have been calculated by the geometry computing section 4, and with a second control signal indicating whether the coordinate values and color data, that have been calculated by the geometry computing section 4, of the polygon are to be stored in the main memory 3.

Figure 4:
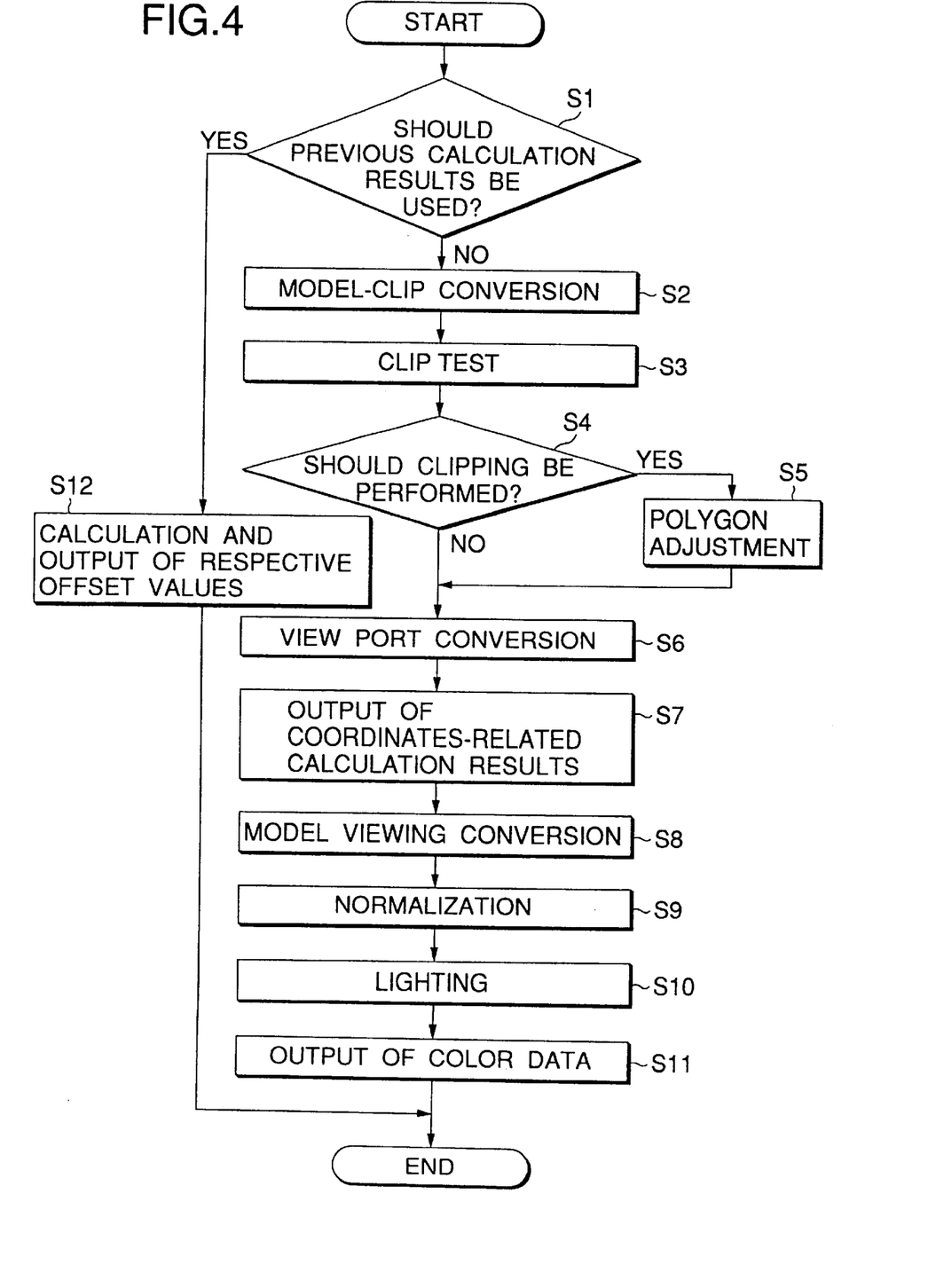
FIG. 4 is a flowchart showing the operation of a geometry computing section 4.

The operation of the geometry computing section 4 will now be described with reference to a flowchart of FIG. 4. At step S1, the geometry computing section 4 judges based on the first control signal that is supplied from the main processor 1 whether to calculate coordinate data ΔXd, ΔYd, and ΔZd and luminance values Cr, Cg, and Cb of each apex of the polygon corresponding to the received data. If it is judged that they should be calculated, the process goes to step S2. Otherwise the process goes to step S12.

At step S2, the geometry computing section 4 converts coordinates (Xm, Ym, Zm, 1) of an apex of the polygon on a world coordinate system (homogeneous coordinate system) into coordinates (Xc, Yc, Zc, Wc) on a clip coordinate system (homogeneous coordinate system) according to the following equation (model-clip conversion). In the model-clip conversion, perspective transformation and clip conversion are performed at one time.

$$\begin{bmatrix} Xc \\ Yc \\ Zc \\ Wc \end{bmatrix} = \begin{bmatrix} MC00 & MC01 & MC02 & MC03 \\ MC10 & MC11 & MC12 & MC13 \\ MC20 & MC21 & MC22 & MC23 \\ MC30 & MC31 & MC32 & MC33 \end{bmatrix} \begin{bmatrix} Xm \\ Ym \\ Zm \\ 1 \end{bmatrix}$$

At step S3, the geometry computing section 4 judges whether the coordinates-converted apex exists within the view volume by judging whether all of the following six conditions are satisfied:

$Wc+Xc \geq 0$ $Wc-Xc \geq 0$ $Wc+Yc \geq 0$ $Wc-Yc \geq 0$ $Wc+Zc \geq 0$ $Wc-Zc \geq 0$ If any of the above conditions is not satisfied, the apex is outside the view volume. Therefore, the polygon is clipped at step S5. Since the clipped polygon is no longer a triangle, it is divided into a plurality of polygons (triangles).

The thus-generated coordinates (Xc, Yc, Zc, Wc) on the clip coordinate system can be converted into coordinates (X, Y. Z) on a two-dimensional device coordinate system corresponding to a display area according to the following equations (view port conversion):

$X = X_{scale} \times Xc/Wc + X_{offset}$ $Y = Y_{sale} \times Yc/Wc + Y_{offset}$ $Z = Z_{scale} \times Zc/Wc + Z_{offset}$ where $X_{offset}$, $Y_{offset}$, and $Z_{offset}$ are offset values in the X, Y, and Z directions, and $X_{scale}$, $Y_{scale}$, and $Z_{scale}$ are ratios between lengths in the respective directions on the clip coordinate system and the corresponding lengths on the device coordinate system.

The Z coordinate represents information in the depth direction and a display position of an apex in the display area is specified by coordinate values X and Y.

At step S6, the geometry computing section 4 calculates the offset values $X_{offset}$, $Y_{offset}$, and $Z_{offset}$ and the following coordinate data:

$\Delta Xd = X_{scale} \times Xc33 \text{ InvWc}$ $\Delta Yd = Y_{scale} \times Yc \times \text{InvWc}$ $\Delta Zd = Z_{scale} \times Zc \times \text{InvWc}$ In the above equations, InvWc means the reciprocal of Wc and is calculated by using the Newton-Raphson method, for instance.

First, an initial value Inv0 of the Newton-Raphson method is set by referring to a given look-up table. InvWc is then calculated by performing an interactive operation of the Newton-Raphson method according to the following two equations. To obtain a value with higher accuracy, the number of times of iteration may be increased.

$$Inv1 = Inv0 \times (2 - Inv0 \times Wc)$$

$$InvWc = Inv1 \times (2 - Inv1 \times Wc)$$

At step S7, the geometry computing section 4 outputs the thus-calculated coordinate data $\Delta Xd$, $\Delta Yd$, and $\Delta Zd$ and $X_{offset}$, $Y_{offset}$, and $Z_{offset}$ to the data storing circuit 14.

At step S8, the geometry computing section 4 converts a normal vector (Nxm, Nym, Nzm) of each apex on the world coordinate system into a vector (Nxe, Nye, Nze) on an eye coordinate system according to the following equations (model viewing conversion):

$$\begin{bmatrix} Nxc \\ Nyc \\ Nzc \end{bmatrix} = \begin{bmatrix} MVit00 & MVit01 & MVit02 \\ MVit10 & MVit11 & MVit12 \\ MVit20 & MVit21 & MVit22 \end{bmatrix} \begin{bmatrix} Nxm \\ Nym \\ Nzm \end{bmatrix}$$

At step S9, to normalize the vector (Nxe, Nye, Nze) on the eye coordinate system, the reciprocal of the magnitude {(Nxe, Nye, Nze)·(Nxe, Nye, Nze)}½ of the vector (Nxe, Nye, Nze) on the eye coordinate system.

The reciprocal InvLen of the magnitude of the vector (Nxe, Nye, Nze) is calculated by first calculating the inner product Len2 between the vector (Nxe, Nye, Nze) and itself, then setting an initial value n0 corresponding to the value Len2 by referring to a look-up table, and finally performing an iterative operation of the Newton-Raphson method according to the following equations:

$$n1 = 0.5 \times n0 \times (3 - n0^2 \times Len2)$$

$$InvLen = 0.5 \times n1 \times (3 - n1^2 \times Len2)$$

At step S10, the geometry computing section 4 calculates a coordinates-conversion-related coefficient NV for diffusion light according to the following equation (lighting process):

$$NV = (Nxe, Nye, Nze) \cdot (Vlx, Vly, Vlz) \times InvLen$$

To calculate a coordinates-conversion-related coefficient NHS for reflection light, first a value NH is calculated according to the following equation:

$$NH = (Nxt, Nyt, Nzt) \cdot (Hlx, Hly, Hlz) \times InvLen$$

The coordinates-conversion-related coefficient NHS for reflection light is set at the kth power of NH where k is a given integer. If the accuracy need not be high, the value NHS can be calculated from the value NH according to the following equation by referring to two look-up tables:

$$NHS = ExpLookup(round(LogLookup(round(NH))) \times k)$$

In the above equation, round(x) is a process for rounding x with given accuracy. LogLookup(x) means a value corresponding to x of a look-up table of natural logarithms ln(x), and ExpLookup(x) means a value corresponding to x of a lookup table of an exponential function exp(x).

Luminance values Cr, Cg, and Cb are then calculated according to the following equation:

$$\begin{bmatrix} Cr \\ Cg \\ Cb \end{bmatrix} = \begin{bmatrix} Ar \\ Ag \\ Ab \end{bmatrix} + NV * \begin{bmatrix} Dmr \\ Dmg \\ Dmb \end{bmatrix} + NHS * \begin{bmatrix} Sr \\ Sg \\ Sb \end{bmatrix}$$

In the above equation, the vector (Ar, Ag, Ab) represents respective luminance values of ambient light, the vector (Dmr, Dmg, Dmb) represents respective luminance values of diffusion light, and the vector (Sr, Sg, Sb) represents respective luminance values of reflection light.

At step S11, the geometry computing section 4 outputs the calculated luminance values Cr, Cg and Cb to the data storing circuit 14.

In the above manner, at steps S2–S11, the geometry computing section 4 performs coordinate conversion, clipping, lighting, etc. on graphics data in accordance with the first control signal that is supplied from the main processor 1, and outputs, to the data storing circuit 14, coordinate data $\Delta Xd$, $\Delta Yd$, and $\Delta Zd$ and offset values $X_{offset}$, $Y_{offset}$, and $Z_{offset}$, and luminance values Cr, Cg, and Cb that correspond to each apex of a polygon (triangle). In addition to the above data, the geometry computing section 4 outputs a blending coefficient a, texture coordinate values S, T, and Q, and a fog coefficient F to the data storing circuit 14 together with the first and second control signals.

On the other hand, at step S12, the geometry computing section 4 calculates only offset values $X_{offset}$, $Y_{offset}$, and $Z_{offset}$ based on a movement distance (i.e., a distance from a position of the polygon in a frame when the coordinate data and the luminance values were stored to a position in the current frame for rendering) of an object (i.e., the polygon) to be rendered, and outputs the calculated offset values $X_{offset}$, $Y_{offset}$, and $Z_{offset}$ to the data storing circuit 14 together with the blending coefficient α, the texture coordinate values S, T, and Q, the fog coefficient F, and the first and second control signals. At this time, the load on the bus 15 is low because the amount of data supplied from the main processor 1 is small.

In the above manner, in accordance with the first control signal, the geometry computing section 4 calculates the coordinate data $\Delta Xd$, $\Delta Yd$, and $\Delta Zd$, the offset values $X_{offset}$, $Y_{offset}$, and $Z_{offset}$, and the luminance values Cr, Cg, and Cb (steps S2–S11), or only the offset values $X_{offset}$, $Y_{offset}$, and $Z_{offset}$ (step S12).

Figure 5:
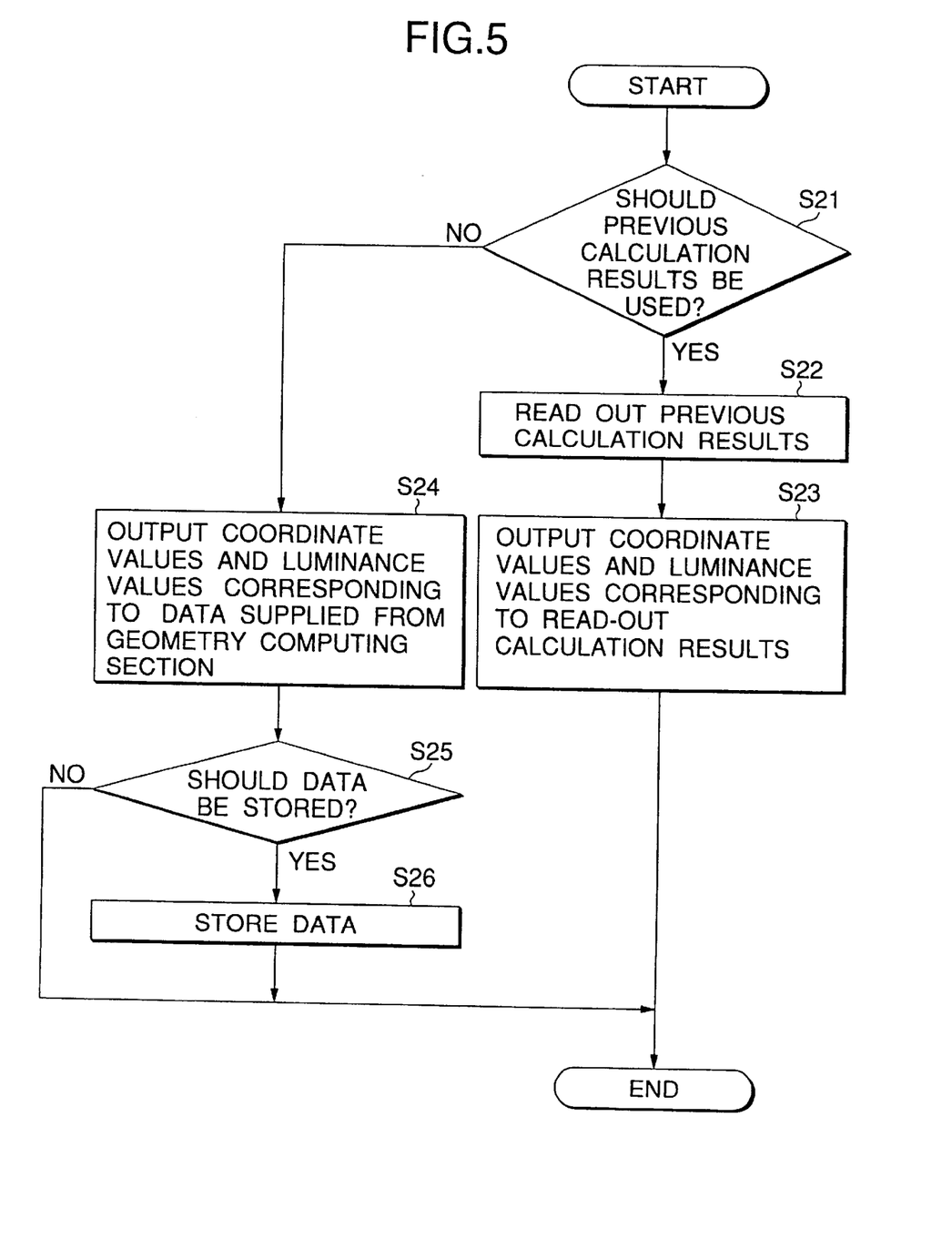
FIG. 5 is a flowchart showing the operation of a data storing circuit 14.

Next, the operation of the data storing circuit 14 will be described with reference to a flowchart of FIG. 5. At step S21, the data storing circuit 14 judges based on the first control signal that is supplied from the geometry computing section 4 whether to use the coordinate data $\Delta Xd$, $\Delta Yd$, and $\Delta zd$ and luminance values Cr. Cg, and Cb that are stored in the main memory 3. If those data should be used, the process goes to step S22. Otherwise the process goes to step S24.

If those data should be used, at step S22 the data storing circuit 14 reads out the coordinate data $\Delta Xd$, $\Delta Yd$, and $\Delta Zd$ and luminance values Cr, Cg, and Cb that are stored in the main memory 3. At step S23, the data storing circuit 14 calculates, as coordinate values X, Y, and Z on the device coordinate system, the respective sums ($\Delta Xd + X_{offset}$, $\Delta Yd + Y_{offset}$, $\Delta Zd + Z_{offset}$) of the read-out coordinate values $\Delta Xd$, $\Delta Yd$, and $\Delta Zd$ and the offset values $X_{offset}$, $Y_{offset}$, and $Z_{offset}$ that are supplied from the geometry computing section 4, and outputs the calculated coordinate values to the DDA set-up section 5 together with the luminance values Cr. Cg, and Cb that are read out from the main memory 3.

On the other hand, at step S24, the data storing circuit 14 calculates, as coordinate values X, Y, and Z on the device coordinate system, the respective sums of the coordinate values ΔXd, ΔYd, and ΔZd and offset values $X_{offset}$, $Y_{offset}$, and $Z_{offset}$ that are supplied from the geometry computing section 4, and outputs the calculated coordinate values to the DDA set-up section 5 together with the luminance values Cr, Cg, and Cb that are supplied from the geometry computing section 4.

At step S25, the data storing circuit 14 judges based on the second control signal that is supplied from the geometry computing section 4 whether to store the coordinate data Δxd, ΔYd, and ΔZd and luminance values Cr, Cg, and Cb that are supplied from the geometry computing section 4 in the main memory 3 via the bus 15. If it is judged that the coordinate data and the luminance data should be stored, at step S26 the data storing circuit 14 stores those values in the main memory 3 via the bus 15. On the other hand, if it is judged that those data should not be stored, step S26 is skipped.

In the above manner, the data storing circuit 14 stores the data that have been calculated by the geometry computing section 4 in the main memory 3 in accordance with the second control signal, as well as reads out the data stored in the main memory 3 and outputs the coordinate values and the luminance values corresponding to the read-out data to the DDA set-up section 5 in accordance with the first control signal.

In addition to the above data, the data storing circuit 14 outputs, as they are, to the DDA set-up section 5, the blending coefficient α, the texture coordinate values S, T, and Q, and the fog coefficient F that are supplied from the geometry computing section 4.

Next, the operation of the DDA set-up section 5 of the rendering circuit 20 will be described. As a pre-process of rendering, first the DDA set-up section 5 judges the shape of the polygon (triangle). In doing so, the DDA set-up section 5 sets an apex having the smallest Y coordinate value among the three apices as apex A, sets an apex having the largest Y coordinate value as apex C, and sets the remaining apex as apex B. If there are two apices having the smallest Y coordinate value in the three apices, the DDA set-up section 5 sets one of the two apices as apex A and sets the other as apex B.

Further, the DDA set-up section 5 calculates, based on the polygon rendering data of the three apices of the polygon, variations of the polygon rendering data with respect to the X and Y directions that will be used for calculating values of the polygon rendering data X, Y, Z, R, G, B, α, S, T. Q, and F at each pixel in the polygon by interpolation.

Figure 6:
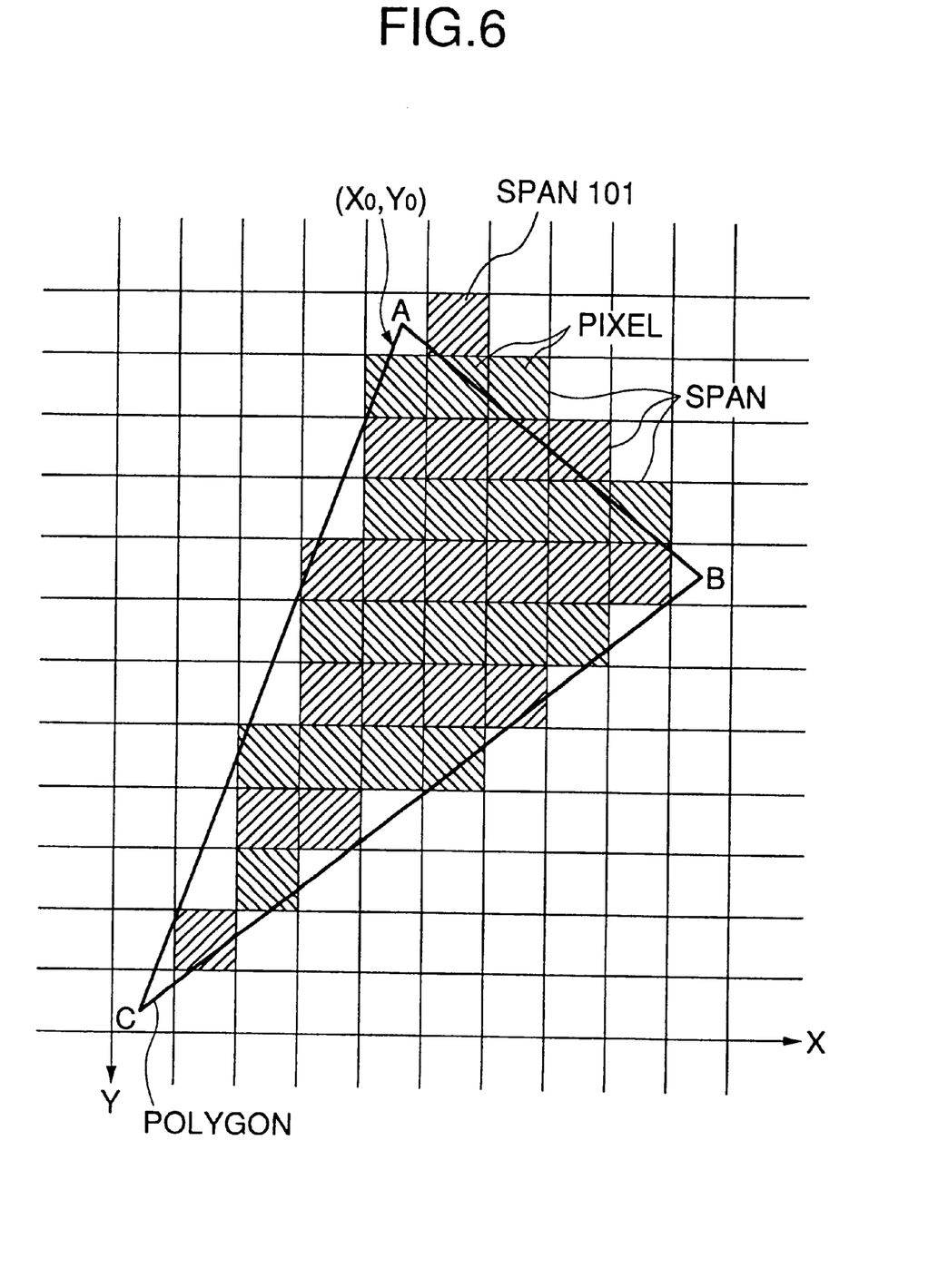
FIG. 6 shows an example of a polygon.

After the calculation of the respective variations, the DDA set-up section 5 temporarily moves the rendering initial point of the polygon to a point $(X_0, Y_0)$ on a side AC that has the same Y coordinate $Y_0$ as a span 101 has that is closest to apex A. Then, the DDA set-up section 5 calculates values of the respective polygon rendering data by interpolation and outputs those values to the DDA section 6 together with the variations with respect to the X direction. Thereafter, the DDA set-up section 5 sequentially calculates, by interpolation, values of the polygon rendering data at respective points on the side AC corresponding to each span, and sequentially outputs the calculated values to the DDA section 6. Each pixel in FIG. 6 is represented by coordinate values of the bottom-left corner of the pixel.

The DDA section 6 performs a DDA operation, thereby executing a rendering process on a span corresponding to data that are supplied from the DDA set-up section 5. Further, the DDA section 6 sequentially outputs polygon rendering data corresponding to respective pixels that have been subjected to the rendering process to the texture processor 7.

The texture processor 7 reads out texture data from the texture buffer 9. The texture processor 7 converts texture coordinate values that are supplied from the DDA section 6 into actual texture coordinate values by using the texture data, and calculates a coefficient (texture α value) that represents a blending ratio between luminance values at a texture address corresponding to the actual texture coordinate values S and T and the texture data. In accordance with the calculated coefficient, the texture processor 7 blends the luminance values and the texture luminance values.

Further, the texture processor 7 blends, in accordance with the fog coefficient F, a proper fog color with the luminance values that have been obtained by blending in accordance with the texture a value. The texture processor 7 outputs, together with coordinate values X, Y, and Z and the blending coefficient α, generated luminance values to the memory interface 8 as luminance values corresponding to a pixel having the coordinate values X and Y that are supplied from the DDA section 6.

The memory interface 8 reads out a Z value of the Z buffer 11, and judges whether the received pixel is closer to the viewing point than the previously drawn pixel. If the received pixel is closer to this side than the previously drawn pixels, the memory interface 8 updates the Z value of the Z buffer 10 to the received coordinate value Z and writes the received luminance values to the display buffer 10 at an address corresponding to the coordinates of the received pixel.

On the other hand, if the received pixel exists behind the previously drawn pixels, the memory interface 8 discards the received data.

Where the memory interface 8 is set so as to perform α blending, the memory interface 8 blends the luminance values stored in the display buffer 10 and the received luminance values in accordance with the blending coefficient a supplied from the texture processor 7, i.e., at a ratio of α:(1−α), and writes a generated luminance values to the display buffer 10.

The luminance values that have been written to the display buffer 10 are transferred to the CRT control section 12 via the memory interface 8 in accordance with display addresses that are generated by the CRT control section 12 in synchronism with horizontal and vertical sync signals, and temporarily stored in the FIFO section of the CRT control section 12. Then, index values corresponding to those luminance values are output at predetermined intervals to the RAMDAC 13, which outputs analog video signals (RGB signals) obtained by D/A-converting luminance values corresponding to the index values to a predetermined apparatus (not shown).

As described above, coordinate values and color data of apices of a given polygon on the device coordinate system are calculated and the polygon is rendered based on those data.

Even if, for example, the line of sight is changed, an object that is far from the viewing point almost only makes a parallel movement. Therefore, by storing data of the apices of polygons of such an object in the main memory 3, the data can be used for rendering the object in subsequent frames.

Polygons whose apex data are to be stored may be specified by an application program by utilizing a database, for instance, or in accordance with the coordinate value Z (represents the distance from the viewing point) in the device coordinate system. A large Z value means a long distance from the viewing point to an apex of a polygon. Therefore, for the above-described reason, previously calculated data can be used.

Where a database is used, objects of little motion are registered in advance in the database when, for instance, an application program is produced.

As a further alternative, polygons to be stored may be specified in accordance with the amount of movement of an object (i.e., displacements in the respective directions of the apices of polygons) on the world coordinate system.

In rendering the background of a display area, there frequently occur cases where changing the offset values is the only operation to be performed. Therefore, polygon data corresponding to the background may be stored and reused.

Although in the embodiment polygon data are stored in the main memory 3 via the bus 15, they may be stored in a RAM (SRAM, DRAM, or the like) by providing the RAM in the data storing circuit 14 or connecting the RAM to the data storing circuit 14.

As described above, in the rendering apparatus and method according to the invention, coordinate data of the apices of a polygon, offset values of a display position, and color data of the apices of the polygon on a coordinate system corresponding to a given display area or only the offset values of the display position are calculated based on coordinate values and color data of the polygon in a three-dimensional space in accordance with a given judgment condition. Coordinate values of the apices of the polygon in the display area are calculated based on the calculated offset values and one of the calculated coordinate data and coordinate data stored in the storage section. The calculated coordinate data and color data are stored in the predetermined storage section in accordance with a given judgment condition. The polygon is rendered by using the calculated coordinate values and color data corresponding to selected coordinate data. Therefore, the amount of operation in calculating coordinate values and color data on the device coordinate system can be reduced.

What is claimed is:

1. A rendering apparatus for converting data of apices of a polygon in a three-dimensional space into data on a coordinate system corresponding to a given display area and rendering the polygon corresponding to the converted data, comprising:

a computing circuit for calculating, for each polygon, coordinate data of apices of the polygon, offset values of a display position of the polygon, and color data of the apices of the polygon on a coordinate system corresponding to a given display area based on coordinate data and color data of the apices of the polygon in a three-dimensional space, the computing circuit is controlled so as to switch between an operation of calculating the coordinate data of the apices of the polygon, the offset values of the display position of the polygon, and the color data of the apices of the polygon and an operation of calculating only the offset values of the display position of the polygon;

a memory for storing coordinate data of the apices of the polygon and color data of the apices of the polygon;

a data output circuit for outputting coordinate data of the apices of the polygon and color data of the apices of the polygon in the display area that are obtained from the offset values of the display position of the polygon and the coordinate data of the apices of the polygon that have been calculated by the computing circuit, the data output circuit further for adding together the offset values of the display position of the polygon that have been calculated by the computing circuit and one of the coordinate data of the apices of the polygon that have been calculated by the computing circuit and the coordinate values of the apices of the polygon supplied from the memory, and outputting one of the color data of the apices of the polygon that have been calculated by the computing circuit and the color data of the apices of the polygon supplied from the memory; and rendering circuit for rendering the polygon corresponding to the coordinate data of the apices of the polygon and the color data of the apices of the polygon in the display area that are supplied from the data output circuit.

2. The rendering apparatus according to claim 1, further comprising a control circuit for generating a control signal, wherein the computing circuit is controlled in accordance with the control signal so as to switch between the operation of calculating the coordinate data of the apices of the polygon, the offset values of the display position of the polygon, and the color data of the apices of the polygon and the operation of calculating only the offset values of the display position of the polygon, and wherein the data output circuit adds together the offset values of the display position of the polygon that have been calculated by the computing circuit and one of the coordinate data of the apices of the polygon that have been calculated by the computing circuit and the coordinate values of the apices of the polygon supplied from the memory and outputs one of the color data of the apices of the polygon that have been calculated by the computing circuit and the color data of the apices of the polygon supplied from the memory, in accordance with the control signal.

3. The rendering apparatus according to claim 1, wherein the data output circuit adds together the offset values of the display position of the polygon that have been calculated by the computing circuit and one of the coordinate data of the apices of the polygon that have been calculated by the computing circuit and the coordinate values of the apices of the polygon supplied from the memory and outputs one of the color data of the apices of the polygon that have been calculated by the computing circuit and the color data of the apices of the polygon supplied from the memory, in accordance with data of depth information of an apex of the polygon that is calculated from the coordinate data of the apex of the polygon in the three-dimensional space.

4. The rendering apparatus according to claim 1, wherein the data output circuit adds together the offset values of the display position of the polygon that have been calculated by the computing circuit and one of the coordinate data of the apices of the polygon that have been calculated by the computing circuit and the coordinate values of the apices of the polygon supplied from the memory and outputs one of the color data of the apices of the polygon that have been calculated by the computing circuit and the color data of the apices of the polygon supplied from the memory, in accordance with a movement distance of the apices of the polygon in the three-dimensional space.

5. The rendering apparatus according to claim 1, wherein the coordinate data of the apices of the polygon and the color data of the apices of the polygon that are stored in the memory are preset.

6. The rendering apparatus according to claim 2, wherein the memory stores, under the control of the control circuit, the coordinate data of the apices of the polygon and the color data of the apices of the polygon that have been calculated by the computing circuit.

7. The rendering apparatus according to claim 1, wherein the color data of the apices of the polygon are data that have been subjected to a lighting process.

8. A rendering method for converting data of apices of a polygon in a three-dimensional space into data on a coordinate system corresponding to a given display area and rendering the polygon corresponding to the converted data, comprising:

a computing step of determining, for each polygon, whether to perform an operation of calculating coordinate data of apices of the polygon, offset values of a display position of the polygon, and color data of the apices of the polygon on a coordinate system corresponding to a given display area based on coordinate data and color data of the apices of the polygon in a three-dimensional space, or an operation of calculating only the offset values of the display position of the polygon, and performing the determined operation;

a data output step of outputting coordinate data of the apices of the polygon in the display area that are obtained by adding together the offset values of the display position of the polygon that have been calculated by the computing step and one of the coordinate data of the apices of the polygon that have been calculated by the computing step and the coordinate values of the apices of the polygon supplied from a memory, and outputting one of the color data of the apices of the polygon that have been calculated by the computing step and the color data of the apices of the polygon supplied from the memory; and a rendering step for rendering the polygon corresponding to the coordinate data of the apices of the polygon and the color data of the apices of the polygon in the display area that are output by the data output step.

9. The rendering method according to claim 8, further comprising the step of generating a control signal, wherein the computing step determines in accordance with the control signal whether to perform the operation of calculating the coordinate data of the apices of the polygon, the offset values of the display position of the polygon, and the color data of the apices of the polygon, or the operation of calculating only the offset values of the display position of the polygon, and wherein the data output step adds together the offset values of the display position of the polygon that have been calculated by the computing step and one of the coordinate data of the apices of the polygon that have been calculated by the computing step and the coordinate values of the apices of the polygon supplied from the memory and outputs one of the color data of the apices of the polygon that have been calculated by the computing step and the color data of the apices of the polygon supplied from the memory, in accordance with the control signal.

10. The rendering method according to claim 8, wherein the data output step adds together the offset values of the display position of the polygon that have been calculated by the computing step and one of the coordinate data of the apices of the polygon that have been calculated by the computing step and the coordinate values of the apices of the polygon supplied from the memory and outputs one of the color data of the apices of the polygon that have been calculated by the computing step and the color data of the apices of the polygon supplied from the memory, in accordance with data of depth information of an apex of the polygon that is calculated from the coordinate data of the apex of the polygon in the three-dimensional space.

11. The rendering method according to claim 8, wherein the data output step adds together the offset values of the display position of the polygon that have been calculated by the computing step and one of the coordinate data of the apices of the polygon that have been calculated by the computing step and the coordinate values of the apices of the polygon supplied from the memory and outputs one of the color data of the apices of the polygon that have been calculated by the computing step and the color data of the apices of the polygon supplied from the memory, in accordance with a movement distance of the apices of the polygon in the three-dimensional space.

12. The rendering method according to claim 8, wherein the coordinate data of the apices of the polygon and the color data of the apices of the polygon that are stored in the memory are preset.

13. The rendering method according to claim 9, wherein the memory stores the coordinate data of the apices of the polygon and the color data of the apices of the polygon that have been calculated by the computing step.

14. The rendering method according to claim 8, wherein the color data of the apices of the polygon are data that have been subjected to a lighting process.

* * * * *